UNITED STATES PATENT OFFICE.

THADDÄUS EMILEWICZ, OF BERLIN, GERMANY, ASSIGNOR TO CHEMISCHE FABRIK AUF ACTIEN, (VORM. E. SCHERING,) OF BERLIN, GERMANY.

ALKYLAMINOMETHYLPENTYL BENZOATE.

No. 837,899.    Specification of Letters Patent.    Patented Dec. 4, 1906.

Application filed March 14, 1906. Serial No. 306,048.

*To all whom it may concern:*

Be it known that I, THADDÄUS EMILEWICZ, doctor of philosophy, chemist, a subject of the Emperor of Austria-Hungary, residing at Berlin, Kingdom of Prussia, German Empire, have invented a new and useful Improvement in the Manufacture of Alkylaminomethylpentyl Benzoates, of which the following is a specification.

The hitherto-unknown alkylaminomethylpentyl benzoates, which possess anesthetic properties, may be obtained by benzoylating alkylaminomethylpentanols as such or in the form of their salts, for example, by treatment with anhydrous benzoic acid or benzoyl chlorid or like benzoylating agents.

The alkylaminomethylpentyl benzoates correspond to the general formula

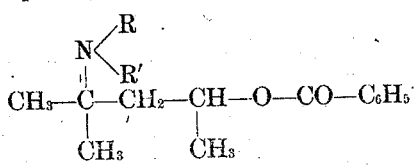

in which R is an alkyl radical and R' a hydrogen atom which can be replaced by an alkyl radical.

The new compounds form strong basic colorless oils which are difficultly soluble in water but easily soluble in organic solvents. They form salts with inorganic and organic acids which possess strong anesthetic properties. The hydrochloric salts are easily soluble in water and are distinguished by a completely neutral reaction even when highly concentrated.

*Example 1 — Methylaminomethylpentyl benzoate, (methyldiacetone alkamin benzoate.)* — Three hundred and fifty grams of methylaminomethylpentanol (methyldiacetone alkamin; see M. Kohn, *Monatshefte für Chemie*, 1904, page 137) are dissolved in one hundred and fifty grams of warm water and heated with six hundred grams of anhydrous benzoic acid for one and one-half to two hours upon a water-bath. Hydrochloric acid is added to acidify, and the precipitated benzoic acid is removed by filtration with the aid of suction. The solution of the product of the reaction is made alkaline with soda and extracted with ether. After distilling off the ethereal solution the free methylaminomethylpentyl benzoate remains behind as a heavy oil. The hydrochloric-acid salt crystallizes out of a mixture of alcohol and ether in thin needles melting at about 161° to 162° centigrade, (uncorrected.) Ten parts of the hydrochloric-acid salt dissolve in thirteen parts of water at 15° centigrade.

*Example 2 — Ethylaminomethylpentyl benzoate, (ethyldiacetonealkamin benzoate.)* — 1.45 kilograms of ethylaminomethylpentanol (ethyldiacetone alkamin; see *Monatshefte für Chemie*, 1904, page 137) are dissolved in three kilograms of ether, and hydrochloric-acid gas is passed through the solution until it gives a feebly-acid reaction. The ether is then distilled off and the dried hydrochloric-acid salt heated with 1.6 kilograms of benzoyl chlorid for three to four hours at 130° to 140° centigrade. The melt is dissolved in water and for the purpose of removing the benzoic acid and small quantities of impurities is shaken with ether or benzene. The product is whitened by means of animal charcoal and the compound set free with an alkali. The separated free ethylaminomethylpentyl benzoate is a strongly basic oil. The hydrochloric-acid salt crystallizes out of a mixture of alcohol and ether in microscopic small needles which combine to form a conglomerate. The melting-point lies at about 172° to 173° centigrade, (uncorrected.)

*Example 3 — Dimethylaminomethylpentyl benzoate, (dimethyldiacetonealkamin benzoate.)* — If in the foregoing example the ethylaminomethylpentanol (ethyldiacetone alkamin) be replaced by dimethylaminomethylpentanol (dimethyldiacetone alkamin) (*Monatshefte für Chemie*, 1904, page 137) and the process be carried out as before, the dimethylaminomethylpentyl benzoate is produced as a basic oil whose hydrochloric-acid salt trickles at about 145° to 146° centigrade (uncorrected) and melts at about 153° to 154° centigrade.

*Example 4 — Diethylaminomethylpentyl benzoate, (diethyldiacetonealkamin benzoate.)* — The starting product for the benzoyl compound — viz., the diethylaminomethylpentanol (diethyldiacetone alkamin) — is preferably formed by allowing three to four molecules of ethyl iodid to react upon the aminomethylpentanol (diacetone alkamin) in presence of alkali in aqueous or alcoholic solution. The manufacture of the diethylaminomethylpentanol (diethyldiacetone alkamin)

may also be performed by using other alkylating agents, such as salts of ethylsulfuric acid, in place of ethyl iodid or by treating the monoethylaminomethylpentanol (monoethyldiacetone alkamin) with an alkylating agent.

In an analogous manner also the other dialkylaminomethylpentanols (dialkyldiacetone alkamins) may be produced.

The diethylaminomethylpentanol (diethyldiacetone alkamin) is a colorless oil boiling at 204° to 206° centigrade (uncorrected) at ordinary pressure.

To obtain the benzoyl compound, eight hundred and sixty grams of diethylaminomethylpentanol (diethyldiacetone alkamin) are dissolved in two hundred and fifty cubic centimeters of benzene, and eight hundred and fifty grams of benzoyl chlorid are added thereto. The mixture is then heated for one to two hours at 100° centigrade, then cooled and filtered by suction. The hydrochloric-acid salt results, from which the base is set free. The hydrochloric-acid salt crystallizes from a mixture of acetone and ether in small needles melting at about 121° to 122° centigrade, (uncorrected.)

Other alkyl derivatives can be formed in an analogous manner.

I claim as my invention—

As new chemical products, the alkylaminomethylpentyl benzoates, the constitution of which answers the formula

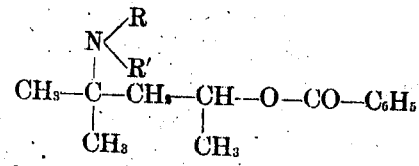

in which R is an alkyl group and R' a hydrogen atom which can be replaced by an alkyl group; said compounds in the form of the free bases being oily bodies difficultly soluble in water, but easily soluble in organic solvents, and combining with inorganic and organic acids to form the corresponding salts which have anesthetic properties.

In testimony whereof I have hereunto set my hand this 23d day of February, 1906.

THADDÄUS EMILEWICZ.

Witnesses:
HENRY HASPER,
WOLDEMAR HAUPT.